United States Patent
Aoyama et al.

(10) Patent No.: US 8,757,784 B2
(45) Date of Patent: Jun. 24, 2014

(54) INK FOR INK JET RECORDING AND RECORDING METHOD

(71) Applicant: Seiko Epson Corporation, Tokyo (JP)

(72) Inventors: Tetsuya Aoyama, Shiojiri (JP); Hidehiko Komatsu, Chino (JP); Hitoshi Ohta, Shiojiri (JP); Takeshi Yano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/852,243

(22) Filed: Mar. 28, 2013

(65) Prior Publication Data

US 2013/0286084 A1 Oct. 31, 2013

(30) Foreign Application Priority Data

Apr. 27, 2012 (JP) .................................. 2012-102967

(51) Int. Cl.
- *B41J 29/38* (2006.01)
- *B41J 2/195* (2006.01)
- *B41J 2/015* (2006.01)
- *C09D 11/00* (2014.01)

(52) U.S. Cl.
USPC ............. 347/95; 347/6; 347/7; 347/9; 347/20

(58) Field of Classification Search
USPC ........................................ 347/6–7, 9, 20, 95
See application file for complete search history.

(56) References Cited

U.S. PATENT DOCUMENTS

| 7,919,544 B2 | 4/2011 | Matsuyama et al. |
| 2003/0079647 A1 | 5/2003 | Kaneko et al. |
| 2005/0124726 A1 | 6/2005 | Yatake et al. |
| 2005/0176847 A1 | 8/2005 | Cagle |
| 2005/0235871 A1 * | 10/2005 | Kato et al. ................. 106/31.86 |
| 2007/0100024 A1 | 5/2007 | Gu et al. |
| 2009/0169761 A1 | 7/2009 | Szajewski et al. |
| 2009/0290007 A1 | 11/2009 | Saitoh et al. |
| 2010/0010121 A1 | 1/2010 | Koganehira et al. |
| 2010/0196602 A1 | 8/2010 | Koyano et al. |
| 2011/0193912 A1 | 8/2011 | Sakai et al. |
| 2011/0300344 A1 | 12/2011 | Tateishi |

FOREIGN PATENT DOCUMENTS

| EP | 1146090 A2 | 10/2001 |
| JP | 20050220352 | 8/2005 |
| JP | 20080260926 | 10/2008 |
| JP | 2010007054 A | 1/2010 |
| JP | 2011162692 | 8/2011 |

OTHER PUBLICATIONS

Extended European Search Report for Application No. EP 13 16 1405 dated Jul. 22, 2013 (6 pages).

* cited by examiner

*Primary Examiner* — Jason Uhlenhake
(74) *Attorney, Agent, or Firm* — Harness, Dickey & Pierce, P.L.C.

(57) ABSTRACT

Ink for ink jet recording includes a coloring material and alkylpolyols, wherein the alkylpolyols include two or more types of first alkylpolyols having a log P value of greater than or equal to −0.7 and less than or equal to 0.01, and a normal boiling point of greater than or equal to 180° C. and lower than or equal to 250° C., and the content of the alkylpolyols is greater than or equal to 5% by mass and less than or equal to 30% by mass.

14 Claims, No Drawings

INK FOR INK JET RECORDING AND RECORDING METHOD

Priority is claimed under 35 U.S.C. §119 to Japanese Application No. 2012-102967 filed on Apr. 27, 2012, which is hereby incorporated by reference in its entirety.

BACKGROUND

1. Technical Field

The present invention relates to ink for ink jet recording, and a recording method using the same.

2. Related Art

In the related art, a method of recording an image using a minute ink droplet discharged from a nozzle of an ink jet recording head, so-called an ink jet recording method, has been known. As the ink used in such an ink jet recording method, those in which a coloring material (pigment, dye, and the like) is dissolved or dispersed in a mixture of an organic solvent and water have been widely used.

For example, JP-A-2008-260926 discloses ink containing a wetting agent such as glycerine or ethylene glycol in order to prevent the clogging in the nozzle of the ink jet recording head. In addition, JP-A-2010-007054 discloses ink containing at least three types of organic solvents among water-insoluble alkanediol, water-soluble 1,2-alkanediol that may have a branched chain, and water soluble 1,3-alkanediol or alkylene glycol that may have a branched chain in order to obtain high-quality images.

However, alkylpolyols among the organic solvents such as wetting agents described above sometimes reduce storage stability of ink, decrease resilience (clogging resilience) if clogging in the nozzle of an ink jet recording head occurs, or reduce discharge stability (continuous printing stability) when continuously recording an image.

SUMMARY

An advantage of some aspects of the invention is to provide ink for ink jet recording having excellent storage stability, and having excellent clogging resilience and continuous printing stability as well, and having a recording method using the ink.

The invention can be realized in the following forms or application examples.

APPLICATION EXAMPLE 1

According to Application Example 1, there is provided ink for ink jet recording containing a coloring material; and alkylpolyols, in which the alkylpolyols may include two or more types of first alkylpolyols having a logP value of greater than or equal to −0.7 and less than or equal to 0.01, and a normal boiling point of greater than or equal to 180° C. and lower than or equal to 250° C., and the content of the alkylpolyols is greater than or equal to 5% by mass and less than or equal to 30% by mass.

In this case, the ink for ink jet recording has excellent storage stability, and has excellent clogging resilience of the nozzle and continuous printing stability as well.

APPLICATION EXAMPLE 2

In the ink for ink jet recording according to Application Example 1, the ink for ink jet recording may not substantially contain alkylpolyols having a normal boiling point of 280° C. or higher.

APPLICATION EXAMPLE 3

In the ink for ink jet recording according to Application Example 1 or 2, the ink for ink jet recording may not substantially contain a pyrrolidone derivative having a normal boiling point of 240° C. or higher.

APPLICATION EXAMPLE 4

In the ink for ink jet recording according to any one of Application Examples 1 to 3, the alkylpolyols may include a second alkylpolyol having a logP value of greater than 0.01, and a normal boiling point of greater than or equal to 180° C. and lower than or equal to 250° C.

APPLICATION EXAMPLE 5

In the ink for ink jet recording according to any one of Application Examples 1 to 4, the ink for ink jet recording may further include a resin, in which the resin may include a resin having a thermal deformation temperature of 40° C. or higher.

APPLICATION EXAMPLE 6

In the ink for ink jet recording according to Application Example 5, the resin having a thermal deformation temperature of 40° C. or higher may include a styrene-acrylic acid copolymer resin, and wax.

APPLICATION EXAMPLE 7

In the ink for ink jet recording according to any one of Application Examples 1 to 6, the ink for ink jet recording may be used in a non-ink-absorbent or low ink-absorbent recording medium.

APPLICATION EXAMPLE 8

According to Application Example 8, there is provided a recording method including recording an image using the ink for ink jet recording according to any one of Application Examples 1 to 7.

DESCRIPTION OF EXEMPLARY EMBODIMENTS

Hereinafter, a preferable embodiment of the invention will be described. The preferable embodiment described below describes one example of the invention. In addition, the invention is not limited to the embodiment below, and includes various modification examples implemented in a range that does not change the gist of the invention.

1. INK FOR INK JET RECORDING

Ink for ink jet recording according to one embodiment of the invention (hereinafter also simply referred to as "ink") contains a coloring material and alkylpolyols. Hereinafter, each component will be described in detail.

1.1. Alkylpolyols

1.1.1. First Alkylpolyol

The ink according to this embodiment contains two or more types of first alkylpolyols as the alkylpolyols. The first alkylpolyol is provided with features such that a logP value is greater than or equal to −0.7 and less than or equal to 0.01, and a normal boiling point is greater than or equal to 180° C. and lower than or equal to 250° C.

Although detailed mechanism has not become apparent, the inventors have found that it is possible to significantly improve continuous printing stability and clogging resilience along with significantly improving storage stability of the ink by containing two or more types of the first alkylpolyols thereby the first alkylpolyols acting synergistically.

Herein, the "logP value" is an index that represents hydrophobicity of a compound. The logP value represents, in an octanol/water system, in which ratio a solute is distributed in these two layers. In other words, when the logP value of the solute is bigger, the hydrophobicity is higher and the solute is well dissolved in an octanol phase. Furthermore, the fact that the logP values of two types of materials are close indicates that the hydrophobicity of each other is similar.

For example, the logP value can be determined using a flask shaking method using the solute and two types of solvents being actually placed in a flask and mixed by shaking the flask well, or a HPLC method using a high performance liquid chromatography (HPLC).

The logP value of the first alkylpolyol is greater than or equal to −0.7 and less than or equal to 0.01. By keeping the logP value within the above range, storage stability of the ink and continuous printing stability can be improved.

In the two or more types of first alkylpolyols, it is preferable that the logP value difference between the first alkylpolyol having a maximum logP value and the first alkylpolyol having a minimum logP value be 0.4 or more in an absolute value. As a result, the storage stability of the ink and the continuous printing stability can be further improved.

A normal boiling point of the first alkylpolyol is greater than or equal to 180° C. and lower than or equal to 250° C., and preferably greater than or equal to 200° C. and lower than or equal to 250° C. By keeping the normal boiling point within the above range, particularly not below the lower limit, clogging resilience of the head can be improved. Furthermore, by keeping the normal boiling point within the above range, particularly not above the upper limit, the speed of printing can be improved since the drying property of the image formed on a recording medium increases. In particular, if the normal boiling points of all the first alkylpolyols included in the ink according to this embodiment are greater than or equal to 200° C. and lower than or equal to 250° C., the clogging resilience of the ink can be further improved.

The first alkylpolyol is not particularly limited as long as it is provided with the features described above, however, examples thereof include 1,2-butanediol (194° C., −0.32), 1,3-butanediol (208° C., −0.70), 2,3-butanediol (180° C., −0.36), 1,2-pentanediol (210° C., −0.30), 1,3-pentanediol (217° C., −0.16), 1,6-hexanediol (240° C., −0.1), 2-methyl-1,3-propanediol (214° C., −0.60), 3-methyl-1,5-pentanediol (249° C., −0.20), 2,2-dimethyl-1,3-propanediol (210° C., −0.30), 3-methyl-1,3-butanediol (203° C., −0.33), 2-methyl-2,4-pentanediol (197° C., 0), or the like. Among these, from the viewpoint of further improving the ink storage stability, the continuous printing stability and the clogging resilience, using one or more types selected from 1,3-butanediol, 1,2-butanediol, 1,2-pentanediol, 3-methyl-1,3-butanediol, 3-methyl-1,5-pentanediol and 1,6-hexanediol is preferable. In addition, the numbers in parentheses represent normal boiling points and logP values.

1.1.2. Other alkylpolyols

The ink according to this embodiment may contain other alkylpolyols in addition to the first alkylpolyol as the alkylpolyols.

The other alkylpolyols are not particularly limited, and examples thereof include 1,2-hexanediol (224° C., 0.50), 1,4-butanediol (230° C., 0.50), 2-methyl-2,4-pentanediol (198° C., 0.88), 2,2,4-trimethyl-1,3-pentanediol (229° C., 1.999), 2,5-hexanediol (221° C., 0.62), 2,5-dimethyl-2,5-hexanediol (215° C., 1.53), propylene glycol (189° C., −0.92), 2,4,7,9-tetramethyl-5-decyne-4,7-diol (255° C., 2.8), 1,2-nonanediol (155° C., 2.5), 1,2-decanediol (255° C., 2.4), 2-butyl-2-ethyl-1,3-propanediol (262° C., 2.1), 1,2-heptanediol (130° C., 1.5), 1,2-octanediol (300° C. or higher, 1.3), 2-methyl-1,2-propanediol (176° C., 0.026), 1-butanoyl glycerol (153° C., 0), trimethylol propane (160° C., −0.47), 1,3-propanediol (212° C., −1.33), glycerin (290° C., −1.76), or the like. These compounds may be used either alone or as a combination of two or more types. In addition, the numbers in parentheses represent normal boiling points and logP values.

Among the other alkylpolyols described above, using a second alkylpolyol having a logP value of greater than 0.01, and a normal boiling point of greater than or equal to 180° C. and lower than or equal to 250° C. is preferable. The second alkylpolyol provided with the corresponding features can further improve the continuous printing stability when used in combination with two or more types of the first alkylpolyols described above.

The logP value of the second alkylpolyol is greater than 0.01, and preferably greater than or equal to 0.01 and less than or equal to 1.2. By the logP value being greater than 0.01, the continuous printing stability tends to be improved.

The normal boiling point of the second alkylpolyol is greater than or equal to 180° C. and lower than or equal to 250° C., and preferably greater than or equal to 200° C. and lower than or equal to 250° C. By keeping the normal boiling point within the above range, particularly not below the lower limit, clogging resilience of the head tends to be improved. Furthermore, by keeping the normal boiling point within the above range, particularly not above the upper limit, the speed of printing tends to be improved since the drying property of the image formed on a recording medium increases.

Examples of the second alkylpolyol include 1,2-hexanediol (224° C., 0.50), 1,4-butanediol (230° C., 0.50), 2-methyl-2,4-pentanediol (198° C., 0.88), 2,2,4-trimethyl-1,3-pentanediol (229° C., 1.999), 2,5-hexanediol (221° C., 0.62), 2,5-dimethyl-2,5-hexanediol (215° C., 1.53), or the like. Among these, using 1,2-hexanediol or 2-methyl-2,4-pentanediol is preferable in terms of excellent compatibility with the first alkylpolyol. The second alkylpolyol may be used either alone or as a combination of two or more types.

It is preferable that the ink according to this embodiment do not substantially contain alkylpolyols having a normal boiling point of 280° C. or higher. This further improves the storage stability of the ink or improves the drying properties of the ink adhered on the recording medium (particularly, a non-ink-absorbent or low ink-absorbent recording medium), thereby suppressing the occurrence of the tack and improving scratch resistance in some cases.

Herein, in the invention, "do not substantially contain A" means a degree of A being not intentionally added when preparing ink, and including a small amount of A inevitably mixed or generated during the preparation or the storage of ink does not matter. Specific examples of "do not substantially contain A" is not to contain 1.0% by mass or more, preferably not to contain 0.5% by mass or more, more preferably not to contain 0.1% by mass or more, even more preferably not to contain 0.05% by mass or more, and particularly preferably not to contain 0.01% by mass or more.

Examples of the alkylpolyols having a normal boiling point of 280° C. or higher include glycerine (normal boiling point 290° C.)

1.1.3. Content of Alkylpolyols

The content of alkylpolyols (that is, the total content of alkylpolyols included in the ink) is greater than or equal to 5% by mass and less than or equal to 30% by mass, preferably greater than or equal to 5% by mass and less than or equal to 25% by mass, and more preferably greater than or equal to 7% by mass and less than or equal to 25% by mass with respect to the total mass of the ink. If the content of the alkylpolyols is greater than the above range, the viscosity of the ink becomes too high, and the continuous printing stability tends to significantly reduced. Furthermore, if the content of the alkylpolyols is less than the above range, the storage stability of the ink tends to be reduced, or the continuous printing stability or the clogging resilience of the nozzle tends to be significantly reduced.

The content of two of more types of the first alkylpolyol (that is, the total content of the first alkylpolyol in the ink) is preferably greater than or equal to 2% by mass and less than or equal to 30% by mass, more preferably greater than or equal to 3% by mass and less than or equal to 25% by mass, even more preferably greater than or equal to 5% by mass and less than or equal to 20% by mass with respect to the total mass of the ink. By keeping the total content of the first alkylpolyol within the above range, particularly not less than the lower limit, the ink having favorable storage stability, continuous printing stability and clogging resilience tends to be obtained. Furthermore, by keeping the content of the first alkylpolyol within the above range, particularly not greater than the upper limit, the ink having excellent discharge stability tends to be obtained since viscosity of the ink can be maintained in an appropriate range as the ink for ink jet recording.

When the second alkylpolyol is added, a content thereof is preferably greater than or equal to 0.1% by mass and less than or equal to 15% by mass, more preferably greater than or equal to 0.1% by mass and less than or equal to 10% by mass, and even more preferably greater than or equal to 1% by mass and less than or equal to 10% by mass with respect to the total mass of the ink. If the content of the second alkylpolyol is within the above range, the effect of improving the continuous printing stability further increases in some cases.

1.2. Coloring Material

The ink according to this embodiment contains a coloring material. Examples of the coloring material include pigments and dyes.

Pigment

By using a pigment as the coloring material, performances such as light resistance of the ink can be improved. Any one of inorganic pigments and organic pigments can be used as the pigment.

Examples of the inorganic pigment include, but are not limited to, carbon black, iron oxide and titanium dioxide.

Examples of the carbon black include, but are not limited to, furnace black, lamp black, acetylene black and channel black (C.I. Pigment Black 7). Commercially available products can be used as the carbon black, and examples thereof include, No. 2, 300, 900, MCF88, No. 20B, No. 33, No. 40, No. 45, No. 52, MA7, MA8, MA100, No. 2200B, Color Black FW1, FW2, FW2V, FW18, FW200, S150, S160, S170, PRINTEX 35, U, V, 140U, SPECIAL BLACK 6, 5, 4A, 4, 250 (hereinbefore, all trade names, manufactured by Evonik Degussa GmbH), CONDUCTX SC, RAVEN 1255, 5750, 5250, 5000, 3500, 1255, 700 (hereinbefore, all trade names, manufactured by Colombian Chemicals Company (Columbia Carbon)), REGAL 400R, 330R, 660R, MOGUL L, MONARCH 700, 800, 880, 900, 1000, 1100, 1300, 1400, ELFTEX 12 (all trade names, manufactured by Cabot Japan K.K).

The inorganic pigment may be used either alone or as a combination of two or more types.

Examples of the organic pigment include, but are not limited to, quinacridone-based pigments, quinacridone quinone-based pigments, dioxazine-based pigments, phthalocyanine-based pigments, anthrapyrimidine-based pigments, Anthanthrone-based pigments, indanthrone-based pigments, flavanthrone-based pigments, perylene-based pigments, diketopyrrolopyrrole-based pigments, perinone-based pigments, quinophthalone-based pigments, anthraquinone-based pigments, thioindigo-based pigments, benzimidazolone-based pigments, isoindolinone-based pigments, azomethine-based pigments and azo-based pigments. Specific examples of the organic pigment include the following.

Examples of the pigment used in the cyan ink include C.I. Pigment Blue 1, 2, 3, 15, 15:1, 15:2, 15:3, 15:4, 15:6, 15:34, 16, 18, 22, 60, 65, 66 and the like.

Examples of the pigment used in the magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, 254 and 264, or C.I. Pigment Violet 19, 23, 32, 33, 36, 38, 43 and 50.

Examples of the pigment used in the yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 150, 151, 153, 154, 155, 167, 172, 180, 185, 213, and the like.

As the pigment used in the ink having colors other than the above, those known in the related art such as green-based pigments and orange-based pigments may be included.

Dye

The dye is not particularly limited, however, various dyes used in common ink jet recording, such as direct dyes, acid dyes, food dyes, basic dyes, reactive dyes, disperse dyes, vat dyes, soluble vat dyes or reactive disperse dyes can be used.

Such dyes include, but are not limited to, C.I. Acid Yellow 17, 23, 42, 44, 79 and 142, C.I. Acid Red 52, 80, 82, 249, 254 and 289, C.I. Acid Blue 9, 45 and 249, C.I. Acid Black 1, 2, 24 and 94, C.I. Food Black 1 and 2, C.I. Direct Yellow 1, 12, 24, 33, 50, 55, 58, 86, 132, 142, 144 and 173, C.I. Direct Red 1, 4, 9, 80, 81, 225 and 227, C.I. Direct Blue 1, 2, 15, 71, 86, 87, 98, 165, 199 and 202, C.I. Direct Black 19, 38, 51, 71, 154, 168, 171 and 195, C.I. Reactive Red 14, 32, 55, 79 and 249, or C.I. Reactive Black 3, 4 and 35.

The coloring material may be used either alone or as a combination of two or more types. In addition, examples of the content of the coloring material is, although not particularly limited, greater than or equal to 0.1% by mass and less than or equal to 20% by mass with respect to the total mass of the ink.

1.3. Other Components

1.3.1. Resin

The ink according to this embodiment may contain a resin. All resins known in the related art can be used as the resin, and examples thereof include a dispersion resin, a resin emulsion, wax, or the like, which will be described later. The resin may be used either alone or as a combination of two or more types.

Among the resins described above, using resins having a heat distortion temperature of 40° C. or higher is preferable, using resins having a heat distortion temperature of greater than or equal to 40° C. and lower than or equal to 150° C. is more preferable, and resins having a heat distortion temperature of greater than or equal to 60° C. and lower than or equal to 150° C. is even more preferable from the viewpoint of being able to record images having good scratch resistance by improving the fixing property of the ink. In addition, the heat distortion temperature in this specification is a term that refers to any one of a glass transition temperature, a minimum film-forming temperature and a melting point.

In addition, it is preferable that two or more types of resins having the heat distortion temperature of 40° C. or higher be included, and it is more preferable that the heat distortion temperature of the resin included in the ink be 40° C. or higher from the viewpoint that the scratch resistance of the image becomes more favorable. In particular, by including wax having the heat distortion temperature of 40° C. or higher and a styrene-acrylic acid copolymer-based resin having a heat distortion temperature of 40° C. or higher, the fixing property of the ink with respect to the recording medium (in particular, a non-ink-absorbent or low ink-absorption recording medium) becomes remarkably excellent. In addition, this combination does not limit the inclusion of other types of resins.

Dispersion Resin

A dispersion resin for dispersing a pigment includes a water-soluble resin or a water-insoluble resin. In addition, the pigment may be a self-dispersing pigment that has a dispersal ability without using a dispersion resin. Hereinafter, as one example, a water-insoluble resin will be described. The water-insoluble resin refers to a resin having solubility of less than 1 g in 100 g of water at 25° C.

The structure of the resin dispersant of the water-insoluble resin as the dispersion resin is not particularly limited, however, two preferable examples will be described.

The first example is a block copolymer resin of a monomer having a hydrophobic group and a monomer having a hydrophilic group, and also, the resin contains a monomer having at least a salt-forming group.

The monomer having the hydrophobic group include methacrylic acid esters such as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate and glycidyl methacrylate, vinyl esters such as vinyl acetate, vinyl cyanide compounds such as acrylonitrile and methacrylonitrile, or vinyl aromatic monomers such as styrene, α-methylstyrene, vinyl toluene, 4-t-butyl styrene, chlorostyrene, vinyl anisole and vinyl naphthalene, and each of these may be used either alone or as a combination or two or more types.

The monomer having the hydrophilic group include polyethylene glycol monomethacrylate, polypropylene glycol monomethacrylate and ethylene glycol-propylene glycol monomethacrylate, and the like, and each of these may be used either alone or as a combination or two or more types. In particular, using a monomer component constituting a branched chain such as polyethylene glycol (2 to 30) monomethacrylate, polyethylene glycol (1 to 15)-propylene glycol (1 to 15) monomethacrylate, polypropylene glycol (2 to 30) methacrylate, methoxypolyethylene glycol (2 to 30) methacrylate, methoxypolytetramethylene glycol (2 to 30) methacrylate, methoxy(ethylene glycol-propylene glycol copolymer) (1 to 30) methacrylate enables the luster of the printed image to be favorable.

The monomer having a salt-forming group includes acrylic acid, methacrylic acid, styrene carboxylic acid, maleic acid and the like, and each of these can be used either alone or as a combination of two or more types.

In addition, macromonomers such as a styrene-based macromonomer and a silicone macromonomer having a polymerizable functional group at one end, and other monomers can be used in combination as well.

The second example is a water-insoluble resin having a hydrophilic structural unit (a) and a hydrophobic structural unit (b). The hydrophilic structural unit (a) is not particularly limited as long as it is derived from a hydrophilic group-containing monomer, and may include those derived from one type of hydrophilic group-containing monomer or two or more types of hydrophilic group-containing monomers. The hydrophilic group may be a dissociative group or a nonionic hydrophilic group without being particularly limited.

The water-insoluble resin in this embodiment can introduce at least any one of the dissociative group and the nonionic hydrophilic group using at least any one of the monomers having a dissociative group (dissociative group-containing monomer) and the monomers having a nonionic hydrophilic group.

The dissociative group is preferable since it has excellent stability in an emulsified or dispersed state. The dissociative group includes a carboxyl group, a phosphate group, a sulfonate group and the like, and among these, a carboxyl group is preferable since dispersion stability is excellent when preparing ink.

The hydrophilic group-containing monomer is preferably a dissociative group-containing monomer, and more preferably a dissociative group-containing monomer having a dissociative group and an ethylenic unsaturated bond. Examples of the dissociative group-containing monomer include an unsaturated carboxylate monomer, an unsaturated phosphate monomer, an unsaturated sulfonate monomer, and the like.

The hydrophobic structural unit (b) preferably includes a structural unit having an aromatic ring bonded to an atom forming a main chain via a linking group. In such a structural unit having an aromatic ring, the aromatic ring is bonded to an atom forming a main chain of the water-insoluble resin via a linking group, and is not directly bonded to an atom forming a main chain of the water-insoluble resin. As a result, since an appropriate distance is maintained between the hydrophobic aromatic ring and the hydrophilic structural unit, the water-insoluble resin and the pigment are prone to interaction, thereby are firmly adsorbed, and dispersibility is further improved.

Further details of preferable monomer species of the second example is disclosed in JP-A-2011-162692, for example.

The weight average molecular weight of the resin dispersion is preferably in the range of 1,000 to 200,000, and more preferably in the range of 3,000 to 150,000. If the weight average molecular weight is within the above range, pigments are stably dispersed in water, and viscosity control when applied to the ink, and the like, tends to be simple as well.

Furthermore, the acid value is preferably in the range of 30 or more, and more preferably in the range of 50 to 250. If the acid value is within the above range, dispersibility of pigment particles in water can be stably secured, and water resistance of the recorded matter that is recorded using the ink using this can be improved.

The resin dispersant may be used alone or as a combination of two or more types. In addition, the content of the resin dispersant may be appropriately determined without being particularly limited.

Resin Emulsion

The ink of this embodiment may contain a resin emulsion. The resin emulsion fixes ink on a recording medium sufficiently so as to be effective in improving scratch resistance by forming a film with the drying of the ink adhered on the recording medium. In particular, the resin emulsion can form a strong film by heating. In addition, the resin emulsion can improve the fixing property of the ink by being used in combination with wax described below.

Examples of the resin emulsion include, but are not limited to, a homopolymer or a copolymer of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole and vinylidene chloride, a fluorine resin, and a natural resin. Among these, at least any one of a (meth)acrylic resin and a styrene-(meth)acrylic acid copolymer-based resin is preferable, any one of a acrylic resin and a styrene-acrylic acid copolymer-based resin is more preferable, and a styrene-acrylic acid copolymer-based resin is even more preferable. In addition, the above copolymer may be in any one form of a random copolymer, a block copolymer, an alternating copolymer, and a graft copolymer. In this specification, "(meth)acrylic" refers to at least one of acrylic and the corresponding methacrylic.

As the above resin emulsion, those obtained by using materials and preparation methods known in the related art may be used, or commercially available products may be used. Examples of the commercially available products include, but are not limited to, MICROGEL E-1002 and MICROGEL E-5002 (hereinbefore, trade name, manufactured by Nippon Paint Co., Ltd.), VONCOAT 4001 and VONCOAT 5454 (hereinbefore, trade name, manufactured by DIC Corporation), SAE 1014 (trade name, manufactured by Nippon Zeon Co., Ltd.), SAIBINOL SK-200 (trade name, manufactured by Saidan Chemical Industry Co., Ltd.), and JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780 and JONCRYL 7610 (hereinbefore, trade name, manufactured by BASF Corporation) and the like.

When the resin emulsion is included, a content (equivalent to a solid content) thereof is preferably greater than or equal to 0.5% by mass and less than or equal to 7% by mass with respect to the total mass of the ink. If the content is within the above range, it is possible to improve discharge stability since the solid concentration can be reduced.

Wax

The ink of this embodiment may contain wax. By the ink containing wax, the fixing property of the ink on a recording medium becomes excellent. In particular, when the ink includes two or more types of resin having Tg of 40° C. or higher, one type is preferably wax from the viewpoint of scratch resistance.

Emulsion-type wax is preferable among the wax. Examples of the wax include, but are not limited to a polyethylene wax emulsion, a paraffin wax emulsion and polyolefin wax. Among these, using at least one of a polyethylene wax emulsion and a paraffin wax emulsion is preferable since scratch resistance is excellent.

In addition, the "wax emulsion" in this specification usually means those in which solid wax particles are dispersed in water using a surfactant. The "paraffin wax" in this specification means so-called petroleum wax, and means a mixture of hydrocarbon of approximately 300 to 500 weight average molecular weight having a linear paraffin-based hydrocarbon (normal paraffin) of approximately 20 to 30 carbon atoms as the main component, and including a small amount of isoparaffin. Commercially available products can be directly used as the paraffin wax emulsion. Examples of the commercially available products include, but are not limited to, AQUACER 537 and AQUACER 539 (trade name, manufactured by BYK-Chemie GmbH).

Commercially available products can be directly used as the polyethylene wax emulsion. Examples of the commercially available products include, but are not limited to, Nopcoat PEM-17 (trade name, manufactured by San Nopco Limited), CHEMIPEARL W4005 (trade name, manufactured by Mitsui Chemicals, Inc.), and AQUACER 507, AQUACER 515 and AQUACER 539 (hereinbefore, trade name, manufactured by BYK-Chemie GmbH).

When the wax is included, a content (equivalent to a solid content) thereof is preferably greater than or equal to 0.1% by mass and less than or equal to 3% by mass, more preferably greater than or equal to 0.3% by mass and less than or equal to 3% by mass, and even more preferably greater than or equal to 0.3% by mass and less than or equal to 1.5% by mass with respect to the total mass of the ink. If the content is within the above range, the ink can be favorably solidified and fixed.

1.3.2. Others

Surfactant

The ink of this embodiment may include a surfactant. Examples of the surfactant include, but are not limited to, nonionic surfactants. Nonionic surfactants have the effect of uniformly spreading the ink on the recording medium. Therefore, when ink jet recording was carried out using ink including a nonionic surfactant, high-definition images with little blurring can be obtained.

Examples of the nonionic surfactant include, but are not limited to acetylene glycol-based, silicone-based, polyoxyethylene alkyl ether-based, polyoxypropylene alkyl ether-based, polycyclic phenyl ether-based, a sorbitan derivative, and fluorine-based surfactants. Among these, using at least one of acetylene glycol-based surfactants and silicone-based surfactants is preferable.

The acetylene glycol-based surfactant has an excellent ability to properly hold surface tension and interfacial tension, and produces little foam compared to other nonionic surfactants. Thus, the ink containing the acetylene glycol-based surfactant can properly hold interfacial tension and surface tension with a printer member such as the nozzle surface of the head, which is in contact with the ink. As a result, discharge stability can be improved by using ink containing the acetylene glycol-based surfactant in the jet recording method. In addition, the acetylene glycol-based surfactant shows favorable affinity (and wettability) and permeability with respect to the recording medium, therefore, the image recorded using ink containing this becomes high definition with little blurring.

Examples of the acetylene glycol-based surfactant include, but are not limited to, SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA and DF110D (hereinafter, all trade names, manufactured by Air Products and Chemicals Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14 and AE-3 (hereinbefore, all trade names, manufactured by Nissin Chemical Industry Co. Ltd.), and ACETYLENOL E00, E00P, E40 and E100 (hereinbefore, all trade names, manufactured by Kawaken Fine Chemicals Co., Ltd.). The acetylene glycol-based surfactant may be used either alone or as a combination of two or more types.

When the acetylene glycol-based surfactant is included, a content thereof is preferably greater than or equal to 0.1% by mass and less than or equal to 3% by mass with respect to the total mass of the ink.

Compared to other nonionic surfactants, a silicone surfactant has an excellent effect of uniformly spreading the ink so as to prevent the blurring on the recording medium.

The silicone-based surfactant preferably include, but is not limited to, polysiloxane-based compounds. Examples of the polysiloxane-based compound include, but are not limited to, polyether-modified organosiloxane. Examples of commercially available products of polyether-modified organosiloxane include BYK-306, BYK-307, BYK-333, BYK-341, BYK-345, BYK-346 and BYK-348 (hereinbefore, trade name, manufactured by BYK-Chemie GmbH), KF-351A, KF-352A, KF-353, KF-354L, KF-355A, KF-615A, KF-945, KF-640, KF-642, KF-643, KF-6020, X-22-4515, KF-6011, KF-6012, KF-6015 and KF-6017 (hereinbefore, trade name, manufactured by Shin-Etsu Chemical Co., Ltd.). The silicone-based surfactant may be used either alone or as a combination of two or more types.

When the silicone-based surfactant is included, a content thereof is preferably greater than or equal to 0.1% by mass and less than or equal to 3% by mass with respect to the total mass of the ink.

Glycol Ethers

The ink according to this embodiment preferably includes glycol ethers having an HLB value calculated using a Davis method being within the range of 4.2 to 7.8. By including glycol ethers having an HLB value within the above range, the ink according to this embodiment is hardly affected by the type of recording medium, and can control wettability and the rate of penetration. As a result, it is possible to record a clear image, in which uneven shading is suppressed, with respect to a non-ink-absorbent or low ink-absorbent recording medium, in particular.

Herein, a HLB value of glycol ethers used in this embodiment is a value to evaluate the hydrophilicity of compounds proposed by Davis et al, and for example, a number obtained by using a Davis method defined in J. T. Davies and E. K. Rideal, "Interface Phenomena" 2nd ed. Academic Press, New York 1963, a non-patent literature, and refers to a value calculated by the following Equation (1).

$$HLB \text{ value} = 7 + \Sigma[1] + \Sigma[2] \quad (1)$$

(In the above Formula (1), [1] represents a cardinal number of the hydrophilic group, and [2] represents a cardinal number of the hydrophobic group.)

Cardinal numbers of typical hydrophobic groups and hydrophilic groups are shown in Table 1 below.

TABLE 1

| Structure | Cardinal Number |
| --- | --- |
| —$CH_2$— | −0.475 |
| —$CH_3$— | −0.475 |

TABLE 1-continued

| Structure | Cardinal Number |
| --- | --- |
| —($CH_2CH_2O$)— | +0.330 |
| —($CHCH_2O$)—$CH_3$ | −0.150 |
| —OH | +1.900 |

In the glycol ethers that can be included in the ink of this embodiment, the HLB value calculated using a Davis method is preferably in the range of 4.2 to 7.8, more preferably in the range of 5.8 to 7.8. If the HLB value is 4.2 or more, the hydrophobicity of glycol ethers becomes weaker and affinity for water that is the main solvent becomes stronger, therefore, the storage stability of the ink can be improved. If the HLB value is 7.8 or less, wettability or permeability to the recording medium is improved, therefore, uneven shading of the image can be prevented. In particular, wettability to a non-ink-absorbent or low ink-absorbent recording medium in which recording surface is hydrophobic tends to be significantly improved.

Specific examples of such glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, triethylene glycol monomethyl ether, and the like. These may be used alone or as a combination of two or more types.

Among these, those in which an alkyl group included in the molecule has a branched structure are preferable. By containing glycol ethers in which an alkyl group has a branched structure, it is possible to record a clear image, in which uneven shading is suppressed, with respect to a non-ink-absorbent or low ink-absorbent recording medium, in particular. Specifically, ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether and diethylene glycol mono-2-methylpentyl ether may be preferably included.

Among the branched structure of the alkyl group included in the above molecule, a 2-methylpentyl group, a 2-ethylpentyl group and a 2-ethylhexyl group are more preferable, and a 2-ethylhexyl group is even more preferable in order for more favorable chromogenic properties.

Specifically, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether and diethylene glycol mono-2-methylpentyl ether may be preferably included. Among these, ethylene glycol mono-2-ethylhexyl ether, diethylene glycol mono-2-ethylhexyl ether and triethylene glycol mono-2-ethylhexyl ether are more preferable.

The content of the glycol ethers is preferably greater than or equal to 0.05% by mass and less than or equal to 6% by mass with respect to the total mass of the ink from the viewpoint of reducing uneven shading by improving wettability and permeability to the recording medium, or improving storage stability and discharge reliability of the ink. If the content is greater than or equal to 0.05% by mass, clear images can be obtained due to wettability, permeability and a drying property of the ink being improved, and the print density (chromogenic properties) tends to be improved as well. In addition, if the content is less than or equal to 6% by mass, clogging stability of the head becomes excellent due to the viscosity decrease of the ink, and storage stability tends to be improved since the glycol ether is completely dissolved in the ink.

Water

The ink according to this embodiment may also contain water. In particular, when the ink is an aqueous ink, water is the main medium of the ink, and is a component evaporated and scattered by drying.

Examples of water include water in which ionic impurities are removed as much as possible such as pure water and ultra-pure water such as ion-exchange water, ultra-filtered water, reverse osmosis water and distilled water. In addition, when water sterilized by the addition of hydrogen peroxide or ultraviolet radiation is used, the bacteria or mold occurring when a pigment dispersed liquid and ink using the pigment dispersed liquid are stored long term can be prevented.

Other Components

In addition to the above components, the ink according to this embodiment may further include a pH adjusting agent such as potassium hydroxide or triethanolamine, a chelating agent such as ethylenediaminetetraacetic acid salt (EDTA), an antiseptic agent and an antifungal agent, a rust inhibitor, and the like.

Pyrrolidone Derivative

It is preferable that the ink according to this embodiment do not substantially contain a pyrrolidone derivative having a normal boiling point of 240° C. or higher. In this way, it is possible to suppress the occurrence of tack and improve the scratch resistance by improving the drying property of the ink adhered on a recording medium (in particular, a non-ink-absorbent or low ink-absorbent recording medium). In particular, even when the heating temperature of the recording medium is made to be 35° C. to 100° C. in order to prevent the deformation of a non-ink-absorbent or low ink-absorbent recording medium and the deterioration of the image, high-speed printing is possible due to the excellent drying property of the ink, and the scratch resistance of the image is made to be excellent. In the related art, pyrrolidone derivatives having a normal boiling point of 240° C. or higher have been widely used in the ink, however, it is preferable that the scratch resistance be improved by using resins having a heat distortion temperature of 40° C. or higher instead of using pyrrolidone derivatives having a normal boiling point of 240° C. or higher from the viewpoint of drying properties.

Examples of the pyrrolidone derivative having a normal boiling point of 240° C. or higher include 2-pyrrolidone (normal boiling point 245° C.). In addition, polyvinylpyrrolidone in which vinyl pyrrolidone is polymerized is not included in the above pyrrolidone derivative.

It is preferable that the ink according to this embodiment do not substantially contain the pyrrolidone derivative. Examples of the pyrrolidone derivative include N-methyl-2-pyrrolidone and N-ethyl-2-pyrrolidone in addition to 2-pyrrolidone. It is preferable that the ink do not contain the pyrrolidone derivative since it has almost no effect in improving the storage stability of the ink.

1.4. Preparation Method of Ink

The ink according to this embodiment can be obtained by mixing the components (materials) described above in any order, and removing impurity components by filtering if necessary. Herein, if adding a pigment, it is preferable that the pigment be prepared as being uniformly dispersed in a solvent in advance, and then mixed since the handling becomes simple.

As the method of mixing each material, a method of stirring and mixing the materials by sequentially adding them in a container equipped with a stirring device such as a mechanical stirrer or a magnetic stirrer is preferably used. As examples of the method of filtering, centrifugal filtration, filter filtration, or the like can be carried out if necessary.

1.5. Physical Properties of Ink

In the ink according to this embodiment, the surface tension at 20° C. is preferably greater than or equal to 20 mN/m and less than or equal to 50 mN/m, and more preferably greater than or equal to 25 mN/m and less than or equal to 40 mN/m from the viewpoint of the balance between the recording quality and the reliability of the ink for ink jet. In addition, the surface tension can be measured by identifying a surface tension when a platinum plate is wetted with ink under the condition of 20° C. using an automatic surface tensiometer CBVP-Z (manufactured by Kyowa Interface Science Co. Ltd.).

In addition, from the same viewpoint, the viscosity of the ink according to this embodiment at 20° C. is greater than or equal to 1 mPa·s and less than or equal to 8 mPa·s, and more preferably greater than or equal to 2 mPa·s and less than or equal to 6 mPa·s. Furthermore, the viscosity can be measured using an oscillation viscometer VM-100AL (manufactured by Yamaichi Electronics Co., Ltd.).

2. RECORDING METHOD

A recording method according to one embodiment of the invention includes an image recording step for recording an image using the ink for ink jet recording described above.

Hereinafter, one example of the recording method according to this embodiment will be described. In addition, the recording method according to this embodiment is not limited to this example.

2.1. Image Recording Step

The recording method according to this embodiment includes an image recording step. The image recording step is, in the ink jet recording method, for recording an image by droplets of the liquid described above being discharged and adhered on the recording medium. In this way, a recorded matter in which the image is recorded on the recording medium can be obtained.

All methods known in the related art can be used as the ink jet recording method, however, since excellent recording can be achieved, a method for discharging droplets of the ink using vibration of a piezoelectric element is preferable.

As means for recording, any recording medium that a user desires may be used. In particular, if the ink including wax and a styrene-acrylic acid copolymer-based resin described above is used, an image having excellent scratch resistance with respect to a non-ink-absorbent or low ink-absorbent recording medium can be recorded.

In the invention, the "non-ink-absorbent or low ink-absorbent recording medium" represents a "recording medium having water uptake of 10 mL/m$^2$ or less from the beginning of contact up to 30 msec$^{1/2}$ in a Bristow method". This Bristow method is most widely used as a method for measuring the amount of liquid absorbed in a short time, and has also been adopted by Japan Technical Association of the Pulp and Paper Industry (JAPAN TAPPI). Details of the test method are described in Standard No. 51, "paper and paperboard-test methods of liquid absorptiveness-Bristow method" of "JAPAN TAPPI paper and pulp test method 2000 edition"

Examples of the non-ink-absorbent recording medium include, but are not limited to those in which plastic is coated or a plastic film is adhered on a substrate such as a plastic film that is not surface-treated for ink jet recording (that is, does not form an ink absorbing layer) or paper, or the like. Examples of the plastic include, but are not limited to, polyvinyl chloride, polyethylene terephthalate, polycarbonate, polystyrene, polyurethane, polyethylene and polypropylene.

Examples of the low-ink-absorbent recording medium include a printing paper such as an art paper, a coated paper or a matte paper.

2.2. Heating Step

The recording method according to this embodiment may include a heating step. The heating step is for drying the ink (image) adhered on a recording medium by heating the recording medium.

The liquid medium included in the ink adhered on the recording medium becomes easy to rapidly evaporate and scatter due to this step, therefore, it is easier to form a film of the ink. As a result, an image can be obtained in a short time in which a dried substance of the ink is firmly fixed (adhered) on the recording medium.

In addition, in this specification, the heating temperature when heating a recording medium refers to a temperature of the recording medium, more particularly a temperature of a recording surface thereof. The heating temperature can be measured by a thermograph using an infrared thermography device H2640/H2630 (manufactured by Nippon Avonics Co., Ltd. (formerly NEC Avio Infrared Technologies Co., Ltd.)).

The timing of the heating of the recording medium is not particularly limited as long as the above objects can be achieved, and for example, the timing of the heating can be at least one of before the ink discharge, during the ink discharge and after the ink discharge.

Examples of the heating before the ink discharge include, but are not limited to, providing heating means at an upstream side of the transport direction and heating the recording medium in advance. In this case, the temperature of the recording surface of the recording medium when the ink is adhered may be approximately 35° C. to 60° C.

Examples of the heating during the ink discharge include, but are not limited to, providing heating means below the area where the ink is discharged toward the recording medium from the head (the opposite side of the recording medium viewed from the transport surface), and discharge and landing (adhesion) of the ink, and heating of the recording medium are carried out at the same time. The recording medium can be also heated by providing heating means on the opposite side viewed from the head (above the head).

Examples of the heating after the ink discharge include, but are not limited to, providing heating means at a downstream side of the transport direction and heating the ink-adhered recording medium.

Specific examples of the heating means that has been described so far include means heating the recording medium from the side opposite to the recording surface by providing a platen heater below the transport surface of the recording medium (the opposite side of the recording medium viewed from the transport surface), means heating the recording medium from various directions by providing a heating chamber or a thermostatic bath in which the recording medium sank during transport, and means heating the recording medium from the recording surface by providing a heater above the transport surface of the recording medium. Examples of the types of the heater including a platen heater, a heating chamber and a thermostatic bath include, but are not limited to, a warm air heater, a hot air heater and an infrared heater.

The heating temperature is preferably 35° C. to 100° C. If the heating temperature is 35° C. or higher, the evaporation and scattering of the liquid medium in the ink can be effectively facilitated, and the drying property (quick-drying property) of the ink becomes excellent. In addition, if the heating temperature is 100° C. or lower, deformation of the recording medium can be prevented or contraction of the image during heating and cooling of the recording medium can be prevented. Furthermore, since the above effects are further increased, the upper limit of the heating temperature is more preferably 100° C. or lower, and more preferably 80° C. or lower while the lower limit of the heating temperature is preferably 40° C. or higher, and more preferably 60° C. or higher.

3. EXAMPLE

Hereinafter, the embodiment of the invention will be described in more detail using examples, however, this embodiment is not limited to these examples.

3.1. Preparation of Ink

Each ink in examples and comparative examples was prepared by placing the materials shown in Table 2 in a container, mixed and stirred for 2 hours using a magnetic stirrer, and then by removing impurities such as rubbish and coarse particles by filtration using a membrane filter having a pore size of 5 μm. In addition, the numerical values in Table 2 represent % by mass, and ion exchange water was added so that the total amount of the ink becomes 100% by mass. The content of the resin is a solid equivalent value.

Each material shown in Table 2 is as follows.
Color material
  Carbon black (C.I. Pigment Black 7)
Resin
  Styrene-acrylic acid copolymer-based resin (trade name "JONCRYL 538J", manufactured by BASF Corporation, emulsion, Tg: 66° C.)
  Polyethylene wax (trade name "AQUACER 515", manufactured by BYK Japan K.K, melting point: 135° C.)
Alkylpolyols
  1,2-pentanediol (normal boiling point: 210° C., logP value: 0.01)

3-methyl-1,5-pentanediol (normal boiling point: 249° C., logP value: −0.20)
1,2-butanediol (normal boiling point: 194° C., logP value: −0.32)
1,3-butanediol (normal boiling point: 208° C., logP value: −0.70)
1,2-hexanediol (normal boiling point: 224° C., logP value: 0.50)
Propylene glycol (normal boiling point: 188° C., logP value: −0.92)
Glycerin (normal boiling point: 290° C., logP value: −2.70)
Pyrrolidone Derivatives
2-pyrrolidone
Others
Ethylene glycol mono-2-ethylhexyl ether (HLB value: 5.4)
BYK-348 (trade name, manufactured by BYK Japan K.K, silicone-based surfactant)
SURFYNOL DF110D (trade name, manufactured by Air Products and Chemicals Inc., acetylene glycol-based surfactant)
Triethanolamine (a pH adjusting agent)
ethylenediaminetetraacetic acid salt (a chelating agent)
Ion exchange water

3.2. Evaluation Test

3.2.1. Storage Stability

Each ink obtained as above was placed in a sample bottle and sealed, respectively. The sample bottle was stored for 14 days at 60° C., and the viscosity was measured when the temperature was restored to 20° C. In particular, by comparing the viscosity of the ink at 20° C. before storage, and the viscosity of the ink at 20° C. after storage, the storage stability of the ink was evaluated.

The viscosity was measured using an oscillation viscometer VM-100AL (manufactured by Yamaichi Electronics Co. Ltd.) after the sample bottle was placed in a hot bath for 4 hours at 20° C.

The evaluation criteria are as follows.
○: The rate of viscosity change was less than 10%.
Δ: The rate of viscosity change was greater than or equal to 20% or less than 10%.
×: The rate of viscosity change was greater than or equal to 20%.

3.2.2. Continuous Printing Stability

The head of an ink jet printer PX-G930 (trade name, manufactured by Seiko Epson Corporation) was filled with each ink. Thereafter, recording of a solid pattern image was carried out 100 sheets in a row with respect to the copy paper of A4 size. As the recording condition, print resolution was 720×720 dpi, and Duty was 100%.

In this specification, the "Duty value" is a value calculated by the following equation.

Duty (%)=Number of dots actually discharged/(vertical resolution×horizontal resolution)×100

(In the formula, "number of dots actually discharged" is the number of dots actually discharged per unit area, and "vertical resolution" and "horizontal resolution" is resolution per unit area, respectively.)

Thereafter, the solid pattern image was checked, and the continuous printing stability was evaluated based on the number of sheets of the recording medium in which nozzle missing occurred.

In addition, the evaluation criteria are as follows.
○: The number of the sheets of the recording medium in which nozzle missing occurred was 0 to 5.
Δ: The number of the sheets of the recording medium in which nozzle missing occurred was 6 to 20.
×: The number of the sheets of the recording medium in which nozzle missing occurred was 21 to 100.

3.2.3. Clogging Resilience

The head of an ink jet printer PX-G930 (trade name, manufactured by Seiko Epson Corporation) was filled with each ink. After filling, the cap of the printer head was removed (that is, the head nozzle surface was made to be easily dried) after checking that there were no filling defects and nozzle clogging by printing a nozzle check pattern, and was allowed to stand under the condition of 25° C./40% RH to 60% RH for a week. After being allowed to stand, and a cleaning operation was performed as necessary, the clogging of the ink in the head was evaluated by observing the status of nozzle discharge by printing the nozzle check pattern.

In addition, the evaluation criteria are as follows.
○: Cleaning operation was performed three times or less, and the ink was successfully discharged from all nozzles.
Δ: Cleaning operation was performed in the range of four to eight times, and the ink was successfully discharged from all nozzles.
×: Cleaning operation was needed nine times or more until the ink was successfully discharged from all nozzles, or there were nozzles that did not successfully discharge even when cleaning operation was performed nine times or more.

3.2.4. Tackiness after Drying

The head of an ink jet printer PX-G930 (trade name, manufactured by Seiko Epson Corporation) that was processed so that the platen can be heated to 45° C. was filled with each ink. Then, after recording of the solid pattern image was carried out with respect to a non-ink-absorbent polypropylene film (trade name "SY51M", UPM RAFLATAC Co. Ltd.), the recording medium was heated for 30 seconds at 70° C. In this way, a recorded matter that is recorded of the solid pattern image was obtained. In addition, as the recording condition, print resolution was 720×720 dpi, and Duty was 100%.

After superimposing LUMIRROR S10 (trade name, manufactured by Toray Industries, Inc.) on the solid pattern image obtained in this manner, it was allowed to stand for 24 hours at 20° C. after applying a load of 30 g and 100 g thereon. In this way, tackiness was evaluated by checking whether or not the image was adhered with respect to LUMIRROR S10.

The evaluation criteria are as follows.
○: There was no adhesion in both having a load of 30 g and a load of 100 g
Δ: There was adhesion in those having a load of 100 g, although there was no adhesion in those having a load of 30 g.
×: There was adhesion in both having a load of 30 g and a load of 100 g.

3.2.5. Scratch Resistance

Scratch resistance was evaluated using a recorded matter that is recorded of the solid pattern image obtained in the same manner as that of "3.2.4 Tackiness After Drying" using a Color Fastness Rubbing Tester AB-301 (trade name, manufactured by Tester Sangyo Co., Ltd.) in accordance with JIS K5701 (ISO 11628) (provides for a method of testing lithographic printing inks, color-exhibiting samples, and printed materials). Specifically, a friction block fitted with a white cotton cloth (conforming JIS L 0803) having a load of 300 g was rubbed on the recording surface (image recording surface) for 50 times reciprocally. Then, the extent of scratches in the recording surface was observed visually.

The evaluation criteria are as follows.

○: There were no scratches in the solid pattern image.

Δ: Scratches occurred in the surface area of the solid pattern image over the area of less than ⅓, however, there was no peeling such as the recording surface being exposed.

x: Peeling such as the recording surface being exposed was seen in the majority of the solid image pattern.

3.2.6. Evaluation Result

The results of the above evaluation tests are shown together in Table 2.

TABLE 2

| | | | | | | | Example | | | | | | | Comparative Example | | |
|---|---|---|---|---|---|---|---|---|---|---|---|---|---|---|---|---|---|
| Types | Material | | 1 | 2 | 3 | 4 | 5 | 6 | 7 | 8 | 9 | 10 | 11 | | 1 | 2 | 3 |
| Coloring Material | Carbon Black | | 8 | 8 | 8 | 8 | 8 | 8 | 8 | 8 | 8 | 8 | 8 | | 8 | 8 | 8 |
| Resin | Styrene-Acrylic Emulsion | | 1 | 1 | 1 | 1 | 1 | 1 | 1 | 1 | 1 | 1 | 1 | | 1 | 1 | 1 |
| | Polyethylene Wax | | 1 | 1 | 1 | 1 | 1 | 1 | 1 | 1 | 1 | 1 | 1 | | 1 | 1 | 1 |
| Alkylpolyols | 1,2-Pentanediol (Boiling Point: 210° C., logP Value: 0.01) | | 6 | | | 6 | 6 | | 4 | 6 | 6 | 6 | 6 | | | | 6 |
| | 3-Methyl-1,5-Pentanediol (Boiling Point: 249° C., logP Value: −0.20) | | | 6 | | | | 1 | 4 | | | | | | | | |
| | 1,2-Butanediol (Boiling Point: 194° C., logP Value: −0.32) | | | | 6 | | | 1 | 6 | | | | | | | | |
| | 1,3-Butanediol (Boiling Point: 208° C., logP Value: −0.70) | | 6 | 6 | 6 | 6 | 6 | 1 | 6 | 6 | 6 | 6 | 6 | | | 6 | 6 |
| | 1,2-Hexanediol (Boiling Point: 224° C., logP Value: 0.50) | | 3 | 3 | 3 | 3 | 3 | 3 | 3 | 3 | 3 | 3 | | | 3 | 3 | 3 |
| | Propylene Glycol (Boiling Point: 188° C., logP Value: −0.92) | | | | | 15 | | | | | | | | | | 6 | 18 |
| | Glycerine (Boiling Point: 290° C., logP Value: −2.70) | | | | | | 1 | | | | | | | | | | |
| (Pyrrolidone Derivative) | 2-Pyrrolidone | | | | | | | | | 3 | | | | | | | |
| Others | Ethylene Glycol Mono-2-ethylhexyl Ether | | 0.8 | 0.8 | 0.8 | 0.8 | 0.8 | 0.8 | 0.8 | 0.8 | 0.8 | 0.8 | 0.8 | | 0.8 | 0.8 | 0.8 |
| | BYK-348 | | 1 | 1 | 1 | 1 | 1 | 1 | 1 | 1 | 1 | 1 | 1 | | 1 | 1 | 1 |
| | SURFYNOL DF110D | | 0.5 | 0.5 | 0.5 | 0.5 | 0.5 | 0.5 | 0.5 | 0.5 | 0.5 | 0.5 | 0.5 | | 0.5 | 0.5 | 0.5 |
| | Triethanolamine | | 0.3 | 0.3 | 0.3 | 0.3 | 0.3 | 0.3 | 0.3 | 0.3 | 0.3 | 0.3 | 0.3 | | 0.3 | 0.3 | 0.3 |
| | Ethylenediaminetetraaceticacid salt | | 0.05 | 0.05 | 0.05 | 0.05 | 0.05 | 0.05 | 0.05 | 0.05 | 0.05 | 0.05 | 0.05 | | 0.05 | 0.05 | 0.05 |
| | Ion Exchange Water | | Residual Amount | Residual Amount | Residual Amount | Residual Amount | Residual Amount | Residual Amount | Residual Amount | Residual Amount | Residual Amount | Residual Amount | Residual Amount | | Residual Amount | Residual Amount | Residual Amount |
| | Total (% by Mass) | | 100 | 100 | 100 | 100 | 100 | 100 | 100 | 100 | 100 | 100 | 100 | | 100 | 100 | 100 |
| Evaluation Result | 1. Ink Stability | | ○ | ○ | ○ | ○ | △ | ○ | ○ | ○ | ○ | ○ | ○ | | X | X | ○ |
| | 2. Continuous Printing Stability | | ○ | ○ | ○ | ○ | ○ | △ | ○ | ○ | ○ | ○ | △ | | X | X | X |
| | 3. Clogging Resilience | | ○ | ○ | △ | △ | ○ | △ | ○ | ○ | ○ | ○ | ○ | | X | △ | ○ |
| | 4. Tackiness After Drying | | ○ | ○ | ○ | ○ | △ | ○ | ○ | △ | ○ | ○ | ○ | | ○ | ○ | ○ |
| | 5. Scratch Resistance | | ○ | ○ | ○ | ○ | △ | ○ | ○ | △ | X | X | ○ | | ○ | ○ | ○ |

As shown in the evaluation results of Table 2, the ink according to examples showed excellent storage stability, and excellent continuous printing stability and clogging resilience as well.

Meanwhile, the ink according to Comparative Example 1 did not contain the first alkylpolyols. As a result, there was a tendency of storage stability, continuous printing stability and clogging resilience being reduced.

The ink according to Comparative Example 2 did not contain two or more types of the first alkylpolyols. As a result, there was a tendency of storage stability and continuous printing stability being reduced.

In the ink according to Comparative Example 3, the total content of alkylpolyols is greater than 30% by mass. Therefore, there was a tendency of continuous printing stability being reduced.

The invention is not limited to the embodiments described above, and various modifications are possible. For example, the invention includes the substantially same configurations as the configurations described in the embodiment (for example, the configurations having the same functions, methods and results, or the configurations having the same purposes and effects). In addition, the invention includes configurations in which non-essential parts of the configurations described in the embodiment are replaced. Furthermore, the invention includes configurations that have the same effects as the configurations described in the embodiment or that can achieve the same purpose as the configurations described in the embodiment. In addition, the invention includes configurations in which technologies known in the related art are added to the configurations described in the embodiment.

What is claimed is:

1. Ink for ink jet recording containing:
    a coloring material; and
    alkylpolyols,
    wherein the alkylpolyols may include two or more types of first alkylpolyols having a log P value of greater than or equal to −0.7 and less than or equal to 0.01, and a normal boiling point of greater than or equal to 180° C. and lower than or equal to 250° C., and
    the content of the alkylpolyols is greater than or equal to 5% by mass and less than or equal to 30% by mass.

2. The ink for ink jet recording according to claim 1,
    wherein the ink for ink jet recording does not substantially contain alkylpolyols having a normal boiling point of 280° C. or higher.

3. The ink for ink jet recording according to claim 1,
    wherein the ink for ink jet recording does not substantially contain a pyrrolidone derivative having a normal boiling point of 240° C. or higher.

4. The ink for ink jet recording according to claim 1,
    wherein the alkylpolyols includes a second alkylpolyol having a log P value of greater than 0.01, and a normal boiling point of greater than or equal to 180° C. and lower than or equal to 250° C.

5. The ink for ink jet recording according to claim 1, further containing:
    a resin,
    wherein the resin includes a resin having a thermal deformation temperature of 40° C. or higher.

6. The ink for ink jet recording according to claim 5,
    wherein the resin having a thermal deformation temperature of 40° C. or higher includes a styrene-acrylic acid copolymer resin, and wax.

7. The ink for ink jet recording according to claim 1,
    wherein the ink for ink jet recording is used in a non-ink-absorbent or low ink-absorbent recording medium.

8. A recording method comprising:
    recording an image using the ink for ink jet recording according to claim 1.

9. A recording method comprising:
    recording an image using the ink for ink jet recording according to claim 2.

10. A recording method comprising:
    recording an image using the ink for ink jet recording according to claim 3.

11. A recording method comprising:
    recording an image using the ink for ink jet recording according to claim 4.

12. A recording method comprising:
    recording an image using the ink for ink jet recording according to claim 5.

13. A recording method comprising:
    recording an image using the ink for ink jet recording according to claim 6.

14. A recording method comprising:
    recording an image using the ink for ink jet recording according to claim 7.

* * * * *